United States Patent
Rosplock (10) Patent No.: US 11,835,069 B2
(45) Date of Patent: Dec. 5, 2023

(54) TEMPERATURE-COMPENSATING INTERNAL LINKAGE

(71) Applicant: Woodward, Inc., Fort Collins, CO (US)

(72) Inventor: James D. Rosplock, Roscoe, IL (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 17/937,683

(22) Filed: Oct. 3, 2022

(65) Prior Publication Data

US 2023/0103801 A1    Apr. 6, 2023

Related U.S. Application Data

(60) Provisional application No. 63/251,905, filed on Oct. 4, 2021.

(51) Int. Cl.
*F15B 15/28*     (2006.01)
*G01D 5/20*      (2006.01)

(52) U.S. Cl.
CPC ....... *F15B 15/2815* (2013.01); *G01D 5/2046* (2013.01)

(58) Field of Classification Search
CPC .......................... F15B 15/2815; G01D 5/2046
See application file for complete search history.

(56) References Cited

U.S. PATENT DOCUMENTS

| 5,150,049 A | 9/1992 | Schuetz |
| 2004/0092349 A1* | 5/2004 | Iwamoto ................ G01B 7/02 |
| | | 137/554 |
| 2008/0178665 A1 | 7/2008 | Leclerc et al. |
| 2018/0143038 A1 | 5/2018 | Daniels et al. |
| 2019/0257327 A1* | 8/2019 | Chen ....................... E02F 9/267 |
| 2021/0278249 A1* | 9/2021 | Plucinski ............... G01N 25/16 |

OTHER PUBLICATIONS

International Search Report and Written Opinion in International Application No. PCT/US2022/077530, dated Jan. 27, 2023, 16 pages.

* cited by examiner

*Primary Examiner* — Alesa Allgood
(74) *Attorney, Agent, or Firm* — Fish & Richardson P.C.

(57) ABSTRACT

The subject matter of this specification can be embodied in, among other things, an actuator that includes a piston configured to actuate relative to a housing, a sensor rod configured to be actuated by the piston, a sensor affixed to the housing and configured to detect a piston position of the piston relative to the housing based on a sensor rod position of the sensor rod relative to the sensor, and a linkage configured to couple the sensor rod to the piston, and to offset a change to the sensor rod position due to a temperature-induced dimensional change to at least one of the housing, piston, the sensor rod, and the sensor.

18 Claims, 5 Drawing Sheets

TEMPERATURE-COMPENSATING INTERNAL LINKAGE

CROSS-REFERENCE TO RELATED PATENT APPLICATIONS

This application claims the benefit of priority to U.S. Patent Application No. 63/251,905, filed Oct. 4, 2021, the contents of which are incorporated by reference herein.

TECHNICAL FIELD

This instant specification relates to linear actuators with internal temperature-compensation features.

BACKGROUND

Actuators and position sensors provide the force and position feedback for control of various functions, such as aircraft engine control. Position accuracy is critical for some applications, and even small accuracy improvements can result in significant reductions in cost of aircraft engine operation. However, position accuracy typically degrades as actuator temperature varies away from the temperature at which the actuators and positon sensors were calibrated. Linear actuator housings and piston materials can change size with changes in temperature, due to the coefficients of thermal expansion inherent to almost all materials. Temperature-induced expansion and contraction of actuator components can cause errors in the position of the controlled function. Similarly, the materials used to construct position feedback sensors, such as linear variable displacement transformers (LVDTs), typically also change size with temperature and can cause additional positional error.

SUMMARY

In general, this document describes linear actuators with internal temperature-compensation features.

In an example embodiment, an actuator includes a piston configured to actuate relative to a housing, a sensor rod configured to be actuated by the piston, a sensor affixed to the housing and configured to detect a piston position of the piston relative to the housing based on a sensor rod position of the sensor rod relative to the sensor, and a linkage configured to couple the sensor rod to the piston, and to offset a change to the sensor rod position due to a temperature-induced dimensional change to at least one of the housing, piston, the sensor rod, and the sensor.

Various embodiments can include some, all, or none of the following features. At least one of the piston, the sensor rod, or the sensor can have a dimension that is subject to a coefficient of thermal expansion. The sensor rod position can be based on the piston position and on a temperature of one or more of the housing, piston, the sensor rod, or the sensor. The linkage can be configured to space the sensor rod from the piston by a predetermined, variable distance based on a coefficient of thermal expansion of the linkage. The sensor can be a linear variable displacement transformer, and the sensor rod can be a core rod of the sensor. The piston can be configured for linear movement of a first piston end relative to the housing, the piston can define a piston cavity that is open at a second piston end opposite the first piston end, the sensor can be affixed to the housing at a first sensor end and extends at least partly into the piston cavity through the second piston end to a second sensor end disposed within the piston cavity opposite the first sensor end, the sensor can define a sensor cavity that is open at the second sensor end, the linkage can be affixed to the piston proximal the second piston end by a first linkage end, and can extend into the piston cavity through the second sensor end, between the piston and the sensor to a second linkage end proximal the first piston end, and the sensor rod can be affixed to the linkage at a first sensor rod end, and can at least partly extend into the sensor cavity through the second sensor end to a second sensor rod end disposed within the sensor cavity. The linkage can be made of a body having a predetermined length extending from the first linkage end to the second linkage end at a predetermined temperature, and the body can be made of a material having a first predetermined coefficient of thermal expansion. The linkage can include a first body portion partly extending between the first linkage end and the second linkage end, the first body portion having a first material and having a first predetermined length at a predetermined temperature and having a predetermined coefficient of thermal expansion, and a second body portion partly extending between the first body portion and one of the first linkage end or the second linkage end, the second body portion having a second material and having a second predetermined coefficient of thermal expansion different from the first predetermined coefficient of thermal expansion and a second predetermined length at the predetermined temperature. The linkage includes a first body portion affixed to the first linkage end at a first body portion end and extending to a second body portion end proximal to the second linkage end, the first body portion having a first material and having a first predetermined length at a predetermined temperature and having a first predetermined coefficient of thermal expansion, a second body portion affixed to the second body portion end at a third body portion end and extending to a fourth body portion end proximal to the first linkage end, the second body portion having a second material and having a second predetermined length at the predetermined temperature and having a second predetermined coefficient of thermal expansion and at least partly overlapping the first body portion by a second predetermined length at the predetermined temperature, and a third body portion extending from a fifth body portion end in contact with the fourth body portion end to a sixth body portion end in proximal with the second body portion end, the third body portion having a third material and having a third predetermined length at the predetermined temperature and having a third predetermined coefficient of thermal expansion and at least partly overlapping the first body portion and the second body portion by a third predetermined length at the predetermined temperature. The actuator can also include a bias member configured to urge the fifth body portion end toward contact with the second body portion end and to urge the sixth body portion end toward contact with the fourth body portion end.

In an example implementation, a method of actuation includes positioning a piston of an actuator at a predetermined position relative to a housing of the actuator, positioning, by the piston, a sensor rod coupled to the piston by a linkage, at a sensor rod position relative to a sensor affixed to the housing, wherein the sensor rod position is based on the predetermined position and on a first temperature-variable dimension of one or more of the actuator, the housing, the sensor rod, and the sensor at a first temperature, providing, by the sensor, an indication of the predetermined position based on the predetermined position at the first temperature, modifying the first temperature-variable dimension based on a second temperature different from the first temperature, offsetting the first temperature-variable dimension at the second temperature by a second temperature-variable dimension of the linkage at the second temperature, and providing, by the sensor, an indication of the predetermined position based on the predetermined position and the offsetting at the second temperature.

Various implementations can include some, all, or none of the following features. At least one of the piston, the sensor rod, or the sensor can have a dimension that is subject to a coefficient of thermal expansion. The sensor rod position can be based on the predetermined position and on a temperature of one or more of the housing, piston, the sensor rod, or the sensor. The linkage can be configured to space the sensor rod from the piston by a predetermined, variable distance based on a coefficient of thermal expansion of the linkage. The sensor can be a linear variable displacement transformer, and the sensor rod is a core rod of the sensor. The piston can be configured for linear movement of a first piston end relative to the housing, the piston can define a piston cavity that is open at a second piston end opposite the first piston end, the sensor can be affixed to the housing at a first sensor end and extend at least partly into the piston cavity through the second piston end to a second sensor end disposed within the piston cavity opposite the first sensor end, the sensor can define a sensor cavity that is open at the second sensor end, the linkage can be affixed to the piston proximal the first piston end by a first linkage end, and extend into the piston cavity through the second sensor end, between the piston and the sensor to a second linkage end proximal the second piston end, and the sensor rod can be affixed to the linkage at a first sensor rod end, and at least partly extends into the sensor cavity through the second sensor end to a second sensor rod end disposed within the sensor cavity. The linkage can be made of a body having a predetermined length extending from the first linkage end to the second linkage end at a predetermined temperature, and the body can be made of a material having a first predetermined coefficient of thermal expansion. The linkage can include a first body portion partly extending between the first linkage end and the second linkage end, the first body portion made of a first material and having a first predetermined length at a predetermined temperature, and a second body portion partly extending between the first body portion and one of the first linkage end or the second linkage end, the second body portion made of a second material and having a second predetermined coefficient of thermal expansion different from the first predetermined coefficient of thermal expansion and a second predetermined length at the predetermined temperature. The linkage can include a first body portion affixed to the first linkage end at a first body portion end and extending to a second body portion end proximal to the second linkage end, the first body portion comprising a first material and having a first predetermined length at a predetermined temperature, a second body portion affixed to the second linkage end at a third body portion end and extending to a fourth body portion end proximal to the first linkage end, the second body portion comprising a second material and having a second predetermined length at the predetermined temperature and at least partly overlapping the first body portion by a second predetermined length at the predetermined temperature, and a third body portion extending from a fifth body portion end in contact with the second body portion end to a sixth body portion end in contact with the fourth body portion end, the third body portion comprising a third material and having a third predetermined length at the predetermined temperature and at least partly overlapping the first body portion and the second body portion by a third predetermined length at the predetermined temperature. The linkage can include a bias member configured to urge the fifth body portion end toward contact with the second body portion end and to urge the sixth body portion end toward contact with the fourth body portion end.

The systems and techniques described here may provide one or more of the following advantages. First, a system can provide increased immunity to the effects of temperature on the dimensions of internal components of linear actuators and position sensors. Second, the system can provide more accurate positioning across a wide and/or varying range of operational temperatures. Third, the system can provide more accurate control of an actuated assembly positioning across a wide and/or varying range of operational temperatures.

The details of one or more implementations are set forth in the accompanying drawings and the description below. Other features and advantages will be apparent from the description and drawings, and from the claims.

DETAILED DESCRIPTION

This document describes systems and techniques for providing accurate linear positioning across wide and varying temperature ranges. In general, linear actuator housings and piston materials change size with changes in temperature, due to the coefficients of thermal expansion inherent to almost all materials. Temperature-induced expansion and contraction of actuator components can cause errors in the position of the controlled function. Similarly, the materials used to construct position feedback sensors, such as linear variable displacement transformers (LVDTs), typically also change size with temperature and can cause additional positional error. In general, these temperature-induced dimensional changes can be compensated for by linkages that also expand and contract with temperature changes, but are arranged to offset the effects of temperature between an actuator and its corresponding position feedback sensor. The passive, mechanical nature of the solution reduces or eliminates the need for electronic or mathematical temperature compensation of the resulting position signal.

Figure 1:
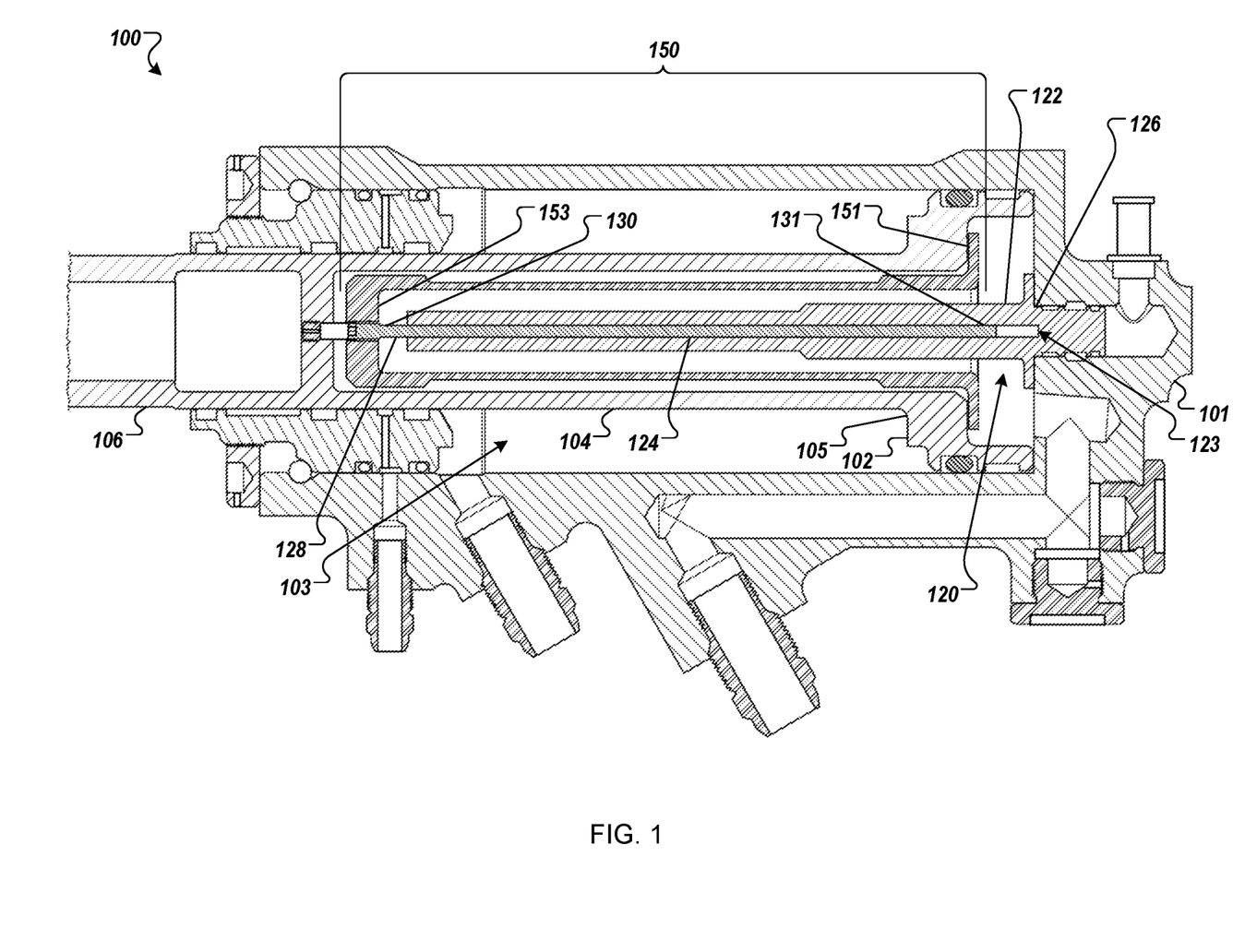
FIG. 1 is a sectional side view of an example of an actuator with example temperature-compensating features.

FIG. 1 is a sectional side view of an example of an actuator 100 with example temperature-compensating features. The actuator 100 is a linear, fluid piston-type actuator that includes a housing 101 and a piston head 102. The piston head 102 is configured for within a cavity 103 defined by the housing 101. A piston rod 104 is affixed to the piston head 102 at a piston end 105 and extends away from the housing 101 at a piston end 106. In operation, linear movement of the piston head 102 urges the piston end 106 to extend and retract relative to the housing 101.

The actuator 100 also includes a position sensor assembly 120. In the illustrated example, the position sensor assembly 120 is a linear variable displacement transformer (LVDT).

The position sensor assembly 120 includes a sensor housing 122 defining a sensor cavity 123 that is open at one end, and a sensor rod 124. The sensor housing 122 is affixed to the housing 101 at a sensor end 126, and a sensor end 128 extends into a piston cavity 103 defined within the piston rod 104. In some embodiments, the sensor housing 122 can be an LDVT body that includes LVDT coils, and the sensor rod 124 can be an LVDT magnetic core rod. The position sensor assembly 120 is affixed, directly or indirectly, to the housing 101 and is configured to detect a piston position of the piston rod 104 relative to the housing 101 based on a linear sensor rod position of the sensor rod 124 relative to the sensor housing 122.

The sensor rod 124 is configured to move linearly, relative to the sensor housing 122, as the piston head 102 and the piston rod 104 move relative to the housing 101. The sensor rod 124 is affixed to the piston head 102 and the piston rod 104 by a linkage 150 at a linkage end 151, configured as a sleeve arranged coaxially between the sensor housing 122 and the piston rod 104. The linkage 150 is configured to couple the sensor rod 124 to the piston head 102 and space the sensor rod 124 from the piston end 106 by a predetermined, variable distance based on a coefficient of thermal expansion of the linkage 150. The linkage 150 is made of one or more materials that have a predetermined coefficient of thermal expansion, and is configured to offset a change to the linear position of the sensor rod 124 relative to the sensor housing 122 due to temperature-induced dimensional changes to at least one of the housing 101, the piston head 102, the piston rod 104, the sensor rod 124, and the sensor housing 122.

In the illustrated example, the linkage 150 is a unitary structure made of a material having a relatively high coefficient of thermal expansion (e.g., plastic, metal, PEEK, aluminum, TEFLON, ceramics) having a predetermined length at a predetermined temperature. In various embodiments, the materials used as the linkage 150 can be selected and configured such that the linkage 150 can provide predetermined dimensional changes (e.g., lengthening and shortening) based on temperature. In some embodiments, the linkage 150 can be configured to at least partly or entirely oppositely offset temperature-induced, linear (e.g., axial) dimensional changes of the other components of the actuator 100.

A sensor rod end 130 of the sensor rod 124 is adjustably threaded into the linkage 150 at a linkage end 153, and extends into the sensor cavity 123 to a rod end 131. The linkage 150 is affixed to the head end of the piston at the linkage end 151. In operation, as the temperature increases, the length of the linkage 150 expands, pulling the sensor rod 124 out of the sensor housing 122, and as the temperature decreases, the length of the linkage 150 contracts, pushing the sensor rod 124 into the sensor housing 122. The movement of the sensor rod 124 compensates for the increasing and decreasing length of the sensor rod 124 and other temperature-induced changes in sensor and actuator component lengths, such that the electrical output/feedback of the position sensor assembly 120 accurately represents the actual position of the piston end 106 relative to the housing 101. In some embodiments, the length of the linkage 150 can be adjusted, for example, to tailor the temperature compensation behavior for particular applications.

Figure 2:
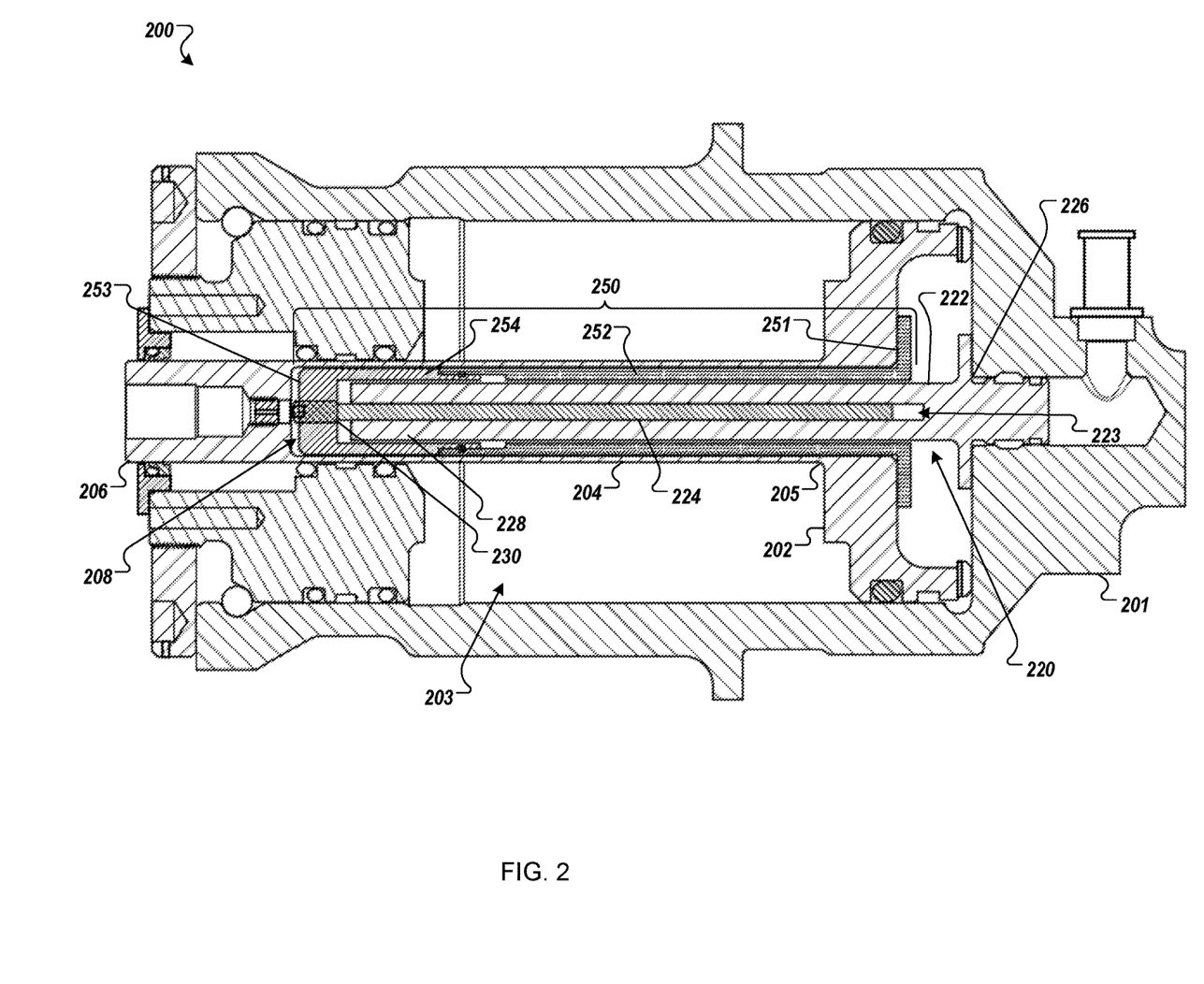
FIG. 2 is a sectional side view of another example of an actuator with example temperature-compensating features.

FIG. 2 is a sectional side view of another example of an actuator 200 with example temperature-compensating features. The actuator 200 is a linear, fluid piston-type actuator that includes a housing 201 and a piston head 202. The piston head 202 is configured for linear movement within a cavity 203 defined by the housing 201. A piston rod 204 is affixed to the piston head 202 at a piston end 205 and extends away from the housing 201 at a piston end 206. In operation, linear movement of the piston head 202 urges the piston end 206 to extend and retract relative to the housing 201.

The actuator 200 also includes a position sensor assembly 220. In the illustrated example, the position sensor assembly 220 is a linear variable displacement transformer (LVDT). The position sensor assembly 220 includes a sensor housing 222 defining a sensor cavity 223, and a sensor rod 224. The sensor housing 222 is affixed to the housing 201 at a sensor end 226, and a sensor end 228 extends into a piston cavity 208 defined within the piston rod 204. In some embodiments, the sensor housing 222 can be an LDVT body that includes LVDT coils, and the sensor rod 224 can be an LVDT magnetic core rod. The position sensor assembly 220 is affixed, directly or indirectly, to the housing 201 and is configured to detect a piston position of the piston rod 204 relative to the housing 201 based on a linear sensor rod position of the sensor rod 224 relative to the sensor housing 222.

The sensor rod 224 is configured to move linearly, relative to the sensor housing 222, as the piston head 202 and the piston rod 204 move relative to the housing 201. The sensor rod 224 is affixed to the piston head 202 and the piston rod 204 by a linkage 250, configured as a sleeve arranged coaxially between the sensor housing 222 and the piston rod 204. The linkage 250 is configured to couple the sensor rod 224 to the piston head 202 and space the sensor rod 224 from the piston end 206 by a predetermined, variable distance based on a coefficient of thermal expansion of the linkage 250. The linkage 250 has a predetermined length at a predetermined temperature and is made of one or more materials that have a predetermined coefficient of thermal expansion, and is configured to offset a change to the linear position of the sensor rod 224 relative to the sensor housing 222 due to temperature-induced dimensional changes to at least one of the housing 201, the piston head 202, the piston rod 204, the sensor rod 224, and the sensor housing 222.

The linkage 250 is an assembly that includes multiple sub-parts arranged along its axial length (e.g., compared to the unitary structure of the example linkage 150 of FIG. 1), and these sub-parts can be selected, arranged, and/or configured to provide a predetermined amount of thermal expansion and contraction (e.g., the assembly can be tuned for particular applications). In the illustrated example, the linkage 250 includes a first tubular body portion 252, affixed to the piston head 202 at a linkage end 251, and a second tubular body portion 254 affixed axially to each other. The first tubular body portion 252 is made of a first material (e.g., metal, plastic, ceramic, aluminum, steel) having a first predetermined length and first predetermined coefficient of expansion. The second tubular body portion 254 is made of a second material (e.g., plastic, metal, PEEK, aluminum, TEFLON, ceramic) having a second predetermined length and a second predetermined coefficient of expansion. In various embodiments, the materials used as the first tubular body portion 252 and the second tubular body portion 254, and/or the structural configurations (e.g., lengths) of the first tubular body portion 252 and the second tubular body portion 254 can be selected and configured such that the linkage 250 can provide predetermined dimensional changes (e.g., lengthening and shortening) based on temperature, the lengths of the tubular body portions 252, 254, and the coefficients of thermal expansion of the tubular body portions 252, 254.

A sensor rod end 230 of the sensor rod 224 is adjustably threaded into the linkage 250 at a linkage end 253. The linkage 250 is affixed to the head end of the piston at the linkage end 251. In operation, as the temperature increases, the length of the linkage 250 expands, pulling the sensor rod 224 out of the sensor housing 222, and as the temperature decreases, the length of the linkage 250 contracts, pushing the sensor rod 224 into the sensor housing 222. The movement of the sensor rod 224 compensates for the increasing and decreasing length of the sensor rod 224 and other temperature-induced changes in sensor and actuator component lengths, such that the electrical output/feedback of the position sensor assembly 220 accurately represents the actual position of the piston end 206 relative to the housing 201. In some embodiments, the lengths of the linkage 250 and the tubular body portions 252 and 254 can be adjusted, for example, to tailor the temperature compensation behavior for particular applications.

Figure 3:
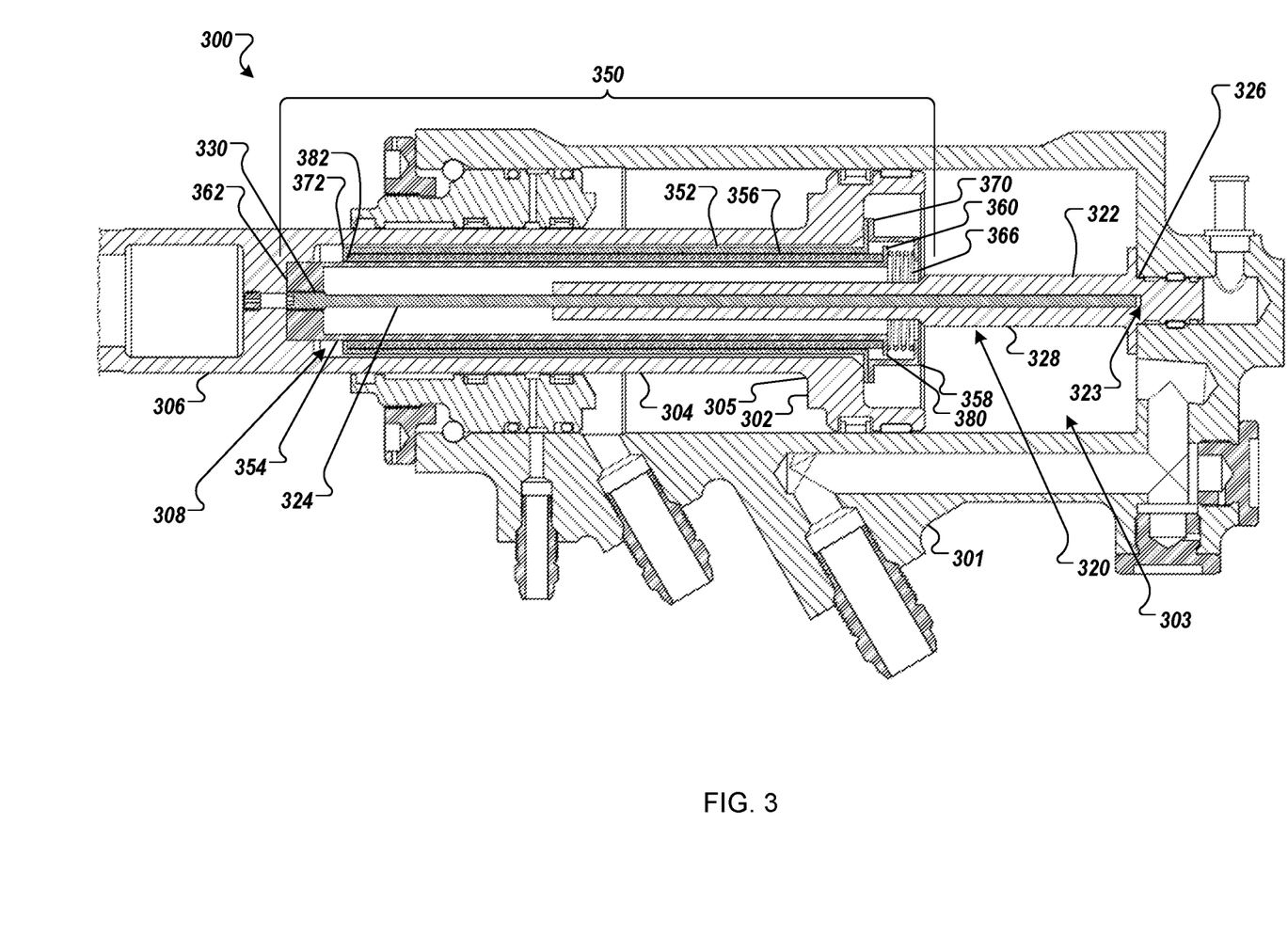
FIG. 3 is a sectional side view of another example of an actuator with example temperature-compensating features.

FIG. 3 is a sectional side view of another example of an actuator 300 with example temperature-compensating features. The actuator 300 is a linear, fluid piston-type actuator that includes a housing 301 and a piston head 302. The piston head 302 is configured for linear movement within a cavity 303 defined by the housing 301. A piston rod 304 is affixed to the piston head 302 at a piston end 305 and extends away from the housing 301 at a piston end 306. In operation, linear movement of the piston head 302 urges the piston end 306 to extend and retract relative to the housing 301.

The example actuator 300 also includes a position sensor assembly 320. In the illustrated example, the position sensor assembly 320 is a linear variable displacement transformer (LVDT). The position sensor assembly 320 includes a sensor housing 322 defining a sensor cavity 323, and a sensor rod 324. The sensor housing 322 is affixed to the housing 301 at a sensor end 326, and a sensor end 328 extends into a piston cavity 308 defined within the piston rod 304. In some embodiments, the sensor housing 322 can be an LDVT body that includes LVDT coils, and the sensor rod 324 can be an LVDT magnetic core rod. The position sensor assembly 320 is affixed, directly or indirectly, to the housing 301 and is configured to detect a piston position of the piston rod 304 relative to the housing 301 based on a linear sensor rod position of the sensor rod 324 relative to the sensor housing 322.

The sensor rod 324 is configured to move linearly, relative to the sensor housing 322, as the piston head 302 and the piston rod 304 move relative to the housing 301. The sensor rod 324 is affixed to the piston head 302 and the piston rod 304 by a linkage 350, configured as a sleeve arranged coaxially between the sensor housing 322 and the piston rod 304. The linkage 350 is configured to couple the sensor rod 324 to the piston head 302 and space the sensor rod 324 from the piston end 306 by a predetermined, variable distance based on a coefficient of thermal expansion of the linkage 350. The linkage 350 has a predetermined length at a predetermined temperature. The linkage 350 is made of one or more materials that have a predetermined coefficient of thermal expansion, and is configured to offset a change to the linear position of the sensor rod 324 relative to the sensor housing 322 due to temperature-induced dimensional changes to at least one of the housing 301, the piston head 302, the piston rod 304, the sensor rod 324, and the sensor housing 322.

The linkage 350 is an assembly that includes multiple sub-parts arranged along its axial length (e.g., compared to the unitary structure of the example linkage 150 of FIG. 1), and these sub-parts can be selected, arranged, and/or configured to provide a predetermined amount of thermal expansion and contraction (e.g., the assembly can be tuned for particular applications). In the illustrated example, the linkage 350 includes a tubular outer linkage sleeve 352 (e.g., a first body portion) arranged concentrically about a tubular inner linkage sleeve 354 (e.g., a second body portion). A tubular compensator sleeve 356 (e.g., a third body portion) is arranged concentrically between the tubular outer linkage sleeve 352 and the tubular inner linkage sleeve 354. The tubular outer linkage sleeve 352 and the tubular inner linkage sleeve 354 are made of a first material (e.g., metal, plastic, ceramic, aluminum, steel) having a first predetermined length and first predetermined coefficient of expansion. The tubular compensator sleeve 356 is made of a second material (e.g., metals, plastics, ceramics, INVAR) having a second predetermined length and a second predetermined coefficient of expansion. A retainer cap 358 is affixed to the tubular outer linkage sleeve 352.

The tubular inner linkage sleeve 354 extends from a body portion end 360 (e.g., shoulder) to a body portion end 362 (e.g., cap end) nested concentrically within a portion of the piston end 306. The body portion end 362 is configured to move (e.g., float) axially within the piston end 306. A bias member 366 (e.g., a spring) is configured to apply a bias force between a retainer cap 358, affixed to the piston head 302, and the body portion end 360 such that body portion end 362 remains at least partly within the piston end 306 as various components of the piston head 302, the piston rod 304, and/or the linkage 350 thermally expand and contract.

The tubular outer linkage sleeve 352 extends from a body portion end 370 (e.g., shoulder) to a body portion end 372 (e.g., cap end). The tubular compensator sleeve 356 is arranged concentrically between the tubular outer linkage sleeve 352 and the tubular inner linkage sleeve 354 and extends from an axial compensator end 380 to an axial compensator end 382. The axial compensator end 380 abuts the body portion end 360 and the axial compensator end 382 abuts the body portion end 372. The force of the bias member 366 on the tubular inner linkage sleeve 354 compresses the tubular compensator sleeve 356 between the tubular outer linkage sleeve 352 and the tubular inner linkage sleeve 354 to keep them in abutting contact as various components of the piston head 302, the piston rod 304, and/or the linkage 350 thermally expand and contract.

In general, the tubular outer linkage sleeve 352, the tubular inner linkage sleeve 354, and the tubular compensator sleeve 356 together can provide up to three different design points that can be adjusted, designed, configured, and/or otherwise selected (e.g., lengths, coefficients of thermal expansion) to provide a predetermined amount of compensation for temperature-induced dimensional changes in other components of the actuator 300 such that the linkage 350 can provide predetermined dimensional changes (e.g., lengthening and shortening) based on temperature.

A sensor rod end 330 of the sensor rod 324 is adjustably threaded into the body portion end 362. The linkage 350 is biased (e.g., spring loaded) against the retainer cap 358 which acts as a stop that is grounded at the piston head 302. In operation, as the temperature increases, the lengths of the tubular outer linkage sleeve 352 and the tubular inner linkage sleeve 354 expand, pulling the sensor rod 324 out of the sensor housing 322, and as the temperature decreases, the lengths of the tubular outer linkage sleeve 352 and the tubular inner linkage sleeve 354 contract, pushing the sensor rod 324 into the sensor housing 322. The movement of the sensor rod 324 compensates for the increasing and decreasing length of the sensor rod 324 and other temperature-induced changes in sensor and actuator component lengths, such that the electrical output/feedback of the position sensor assembly 320 accurately represents the actual position of the piston end 306 relative to the housing 301. In some embodiments, the tubular compensator sleeve 356 can be formed from a material having a low coefficient of thermal expansion. For example, since the length of the tubular compensator sleeve 356 can also affected by temperature changes and can partially negate the movement of the sensor rod 324 based on expansion of the tubular outer linkage sleeve 352 and/or the tubular inner linkage sleeve 354, the tubular compensator sleeve 365 can be constructed of a material that exhibits relatively less dimensional change in order to reduce the degree to which its own expansion and contraction negates the compensation provided by the tubular outer linkage sleeve 352 and/or the tubular inner linkage sleeve 354.

In some embodiments, the lengths of the linkage 350 and the tubular outer linkage sleeve 352, the tubular inner linkage sleeve 354, and/or the tubular compensator sleeve 356 can be adjusted, for example, to tailor the temperature compensation behavior for particular applications. In some embodiments, the tubular compensator sleeve 356 can be made of a material that has a relatively low coefficient of thermal expansion (e.g., INVAR), so as to contribute relatively little to the thermal compensation action of the linkage 350. In some embodiments, the tubular compensator sleeve 356 can be made of a material that has a predetermined coefficient of thermal expansion and actively contribute to the thermal compensation action of the linkage 350.

Figure 4:
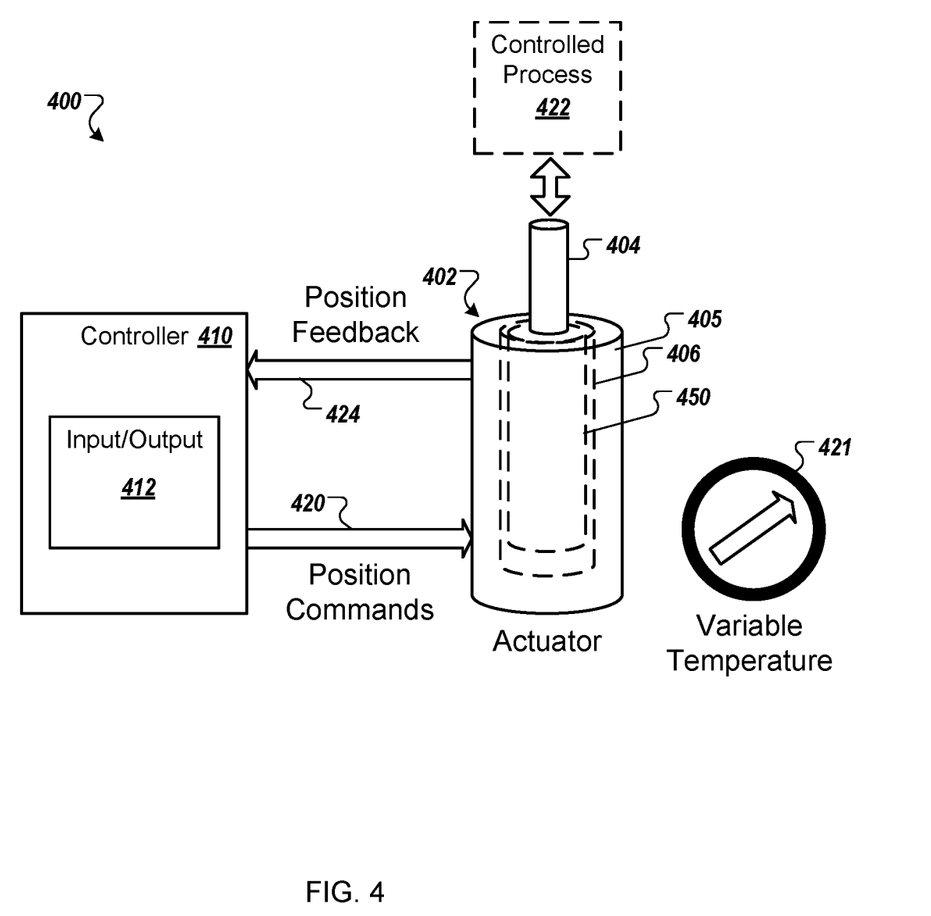
FIG. 4 is a block diagram of an example system for operating an actuator with example temperature-compensating features

FIG. 4 is a block diagram of an example system 400 for operating an actuator 402 with example temperature-compensating features. In some embodiments, the actuator 402 can be any of the example actuators 100, 200, or 300 of FIGS. 1-3.

A controller 410 includes a user input/output interface 412. The controller 410 is configured to receive user input at the interface 412 (e.g., desired configuration of the actuator 402, desired output of a system controlled by the actuator 402) and send corresponding position commands 420 to the actuator 402, either directly (e.g., electrical or data signals sent to an electromechanical actuator) or indirectly (e.g., electrical control of fluid valves that control fluid flows to a fluid actuator), to cause or urge actuation of the actuator 402 to control a controlled process 422.

The actuator 402 includes a piston 404 that is configured to move relative to a housing 405. The piston 404 is linked to a position sensor 406 by a linkage 450. The linkage 450 is at least partly constructed of a material having a predetermined coefficient of thermal expansion, and is configured to offset the thermal expansion and contraction of other components of the actuator 402 caused by a variable temperature 421. In some embodiments, the linkage 450 can be the example linkage 150, 250, or 350 of FIGS. 1-3. The position of the piston 404, as offset by the linkage 450, is sensed by the position sensor 406. Position information sensed by the position sensor 406 is provided as position feedback signals 424.

The position feedback signals 424 are received by the controller 410. In some implementations, the position feedback signals 424 can be used by the controller 410 as closed-loop feedback signals in a closed control loop for controlling the controlled process 422. In some implementations, the controller 410 can interpret the position feedback signals 424 and provide them to a user or another process (e.g., display the position of the piston 404 on a display of the interface 412).

Figure 5:
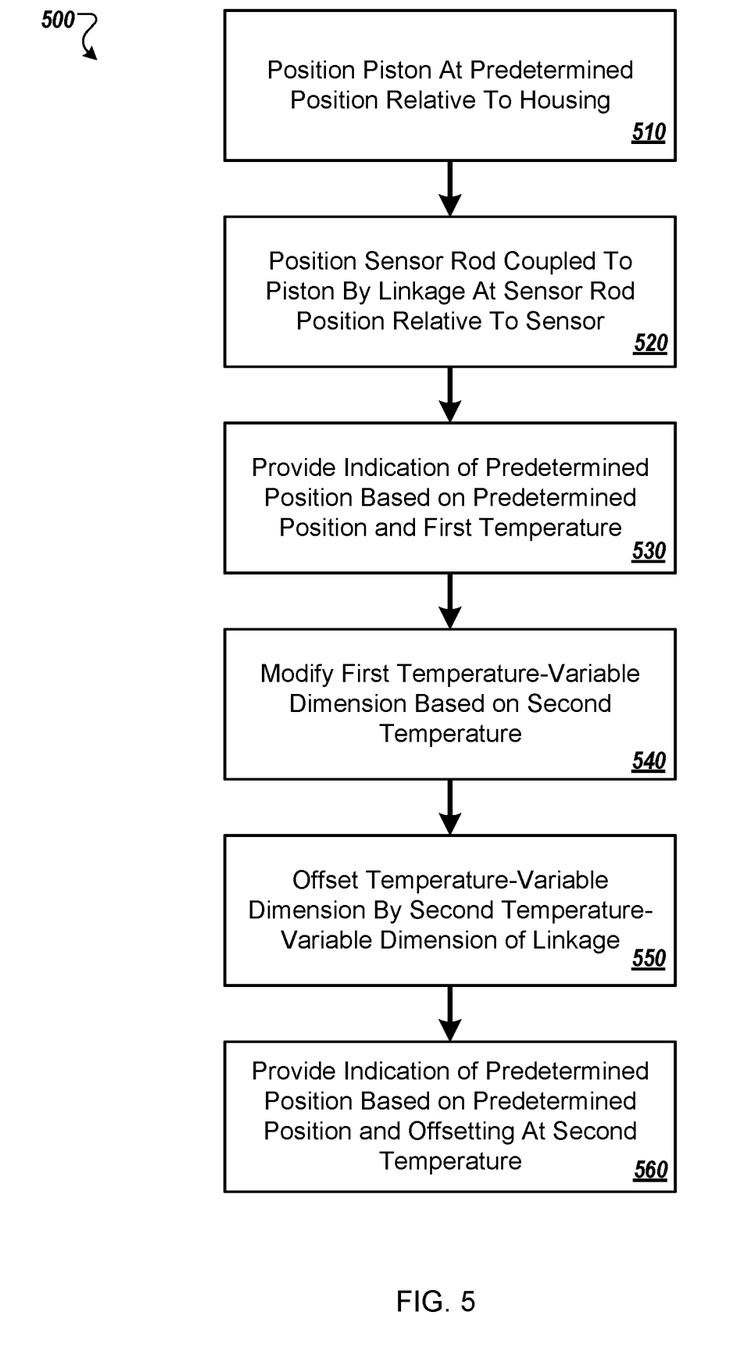
FIG. 5 is flow chart that shows an example of a process for temperature-compensation of an actuator.

FIG. 5 is flow chart that shows an example of a process 500 for temperature compensating an actuator. In some implementations, the process 500 can be performed by some or all of the example system 400 of FIG. 4, using the example actuator 402, or the example actuators 100, 200, or 300 of FIGS. 1-3.

At 510, a piston of an actuator is positioned at a predetermined position relative to a housing of the actuator. For example, the controller 410 can command the actuator 402 to move the piston 404 to a predetermined position relative to the housing 405.

At 520, a sensor rod is positioned by the piston at a sensor rod position relative to a sensor affixed to the housing. The sensor rod is coupled to the piston by a linkage, and the sensor rod position is based on the predetermined position and on a first temperature-variable dimension of one or more of the actuator, the housing, the sensor rod, and the sensor at a first temperature. In some implementations, the sensor can be a linear variable displacement transformer, and the sensor rod can be a core rod of the sensor. In some implementations, the sensor rod position can be based on the predetermined position and on a temperature of one or more of the housing, piston, the sensor rod, or the sensor. For example, the sensor rod 124 is affixed to the piston head 102 by the linkage 150, and the sensor rod 124 changes linear position relative to the housing 101 and the sensor housing 122 as the piston head 102 and the piston rod 104 move. The position of the sensor rod 124 relative to the sensor housing 122 can also be affected by the temperatures of the various components that make up the actuator 100 as the components expand and shrink due to temperature changes.

At 530, the sensor provides an indication of the predetermined position based on the predetermined position at the first temperature. For example, the position sensor assembly 120 can provide a position signal representative of the position of the piston rod 104 relative to the housing 101 at a particular temperature.

At 540, the first temperature-variable dimension is modified based on a second temperature different from the first temperature. For example, the actuator 100 can be heated to a temperature that is higher than the previous temperature, which can cause components of the actuator 100 to expand due to their coefficients of thermal expansion. In another example, the actuator 100 can be cooled to a temperature that is lower than the previous temperature, which can cause components of the actuator 100 to contract.

At 550, the first temperature-variable dimension is offset at the second temperature by a second temperature-variable dimension of the linkage at the second temperature. In some implementations, the linkage can be configured to space the sensor rod from the piston by a predetermined, variable distance based on a coefficient of thermal expansion of the linkage. For example, the linkage 150 can be configured to partly or completely offset (e.g., negate, zero out) thermally-induced expansions and contractions of other components in the actuator 100 that could otherwise cause a temperature-induced change in the position of the sensor rod 124 relative to the sensor housing 122. In some implementations, the linkage 150 can be configured to thermally expand and/or contract in a linear direction that is substantially opposite to the movement caused by thermal expansion and/or contraction of other components in the actuator 100 that could otherwise thermally reposition the sensor rod 124 relative to the sensor housing 122.

At 560, the sensor provides an indication of the predetermined position based on the predetermined position and the offsetting at the second temperature. For example, the position sensor assembly 120 can provide a position signal representative of the position of the piston rod 104 relative to the housing 101 at the different temperature.

In some implementations, at least one of the piston, the sensor rod, or the sensor can have a dimension that is subject to a coefficient of thermal expansion. For example, many materials used in the construction of linear actuators (e.g., metals, plastics, ceramics) can expand and contract as they are heated and cooled.

In some implementations, the piston can be configured for linear movement of a first piston end relative to the housing, the piston can define a piston cavity that is open at a second piston end opposite the first piston end, the sensor can be affixed to the housing at a first sensor end and extend at least partly into the piston cavity through the second piston end to a second sensor end disposed within the piston cavity opposite the first sensor end, the sensor can define a sensor cavity that is open at the second sensor end, the linkage can be affixed to the piston proximal the first piston end by a first linkage end, and can extend into the piston cavity through the second sensor end, between the piston and the sensor to a second linkage end proximal the second piston end, and the sensor rod can be affixed to the linkage at a first sensor rod end, and at least partly extend into the sensor cavity through the second sensor end to a second sensor rod end disposed within the sensor cavity. For example, the position sensor assembly 120 includes the sensor rod 124 that is connected to the linkage 150 at the linkage end 153, and extends into the sensor cavity 123 through an open end.

In some implementations, the linkage can be comprised of a body having a predetermined length extending from the first linkage end to the second linkage end at a predetermined temperature, and the body is comprised of a material having a first predetermined coefficient of thermal expansion. For example, the example linkage 150 extends a predetermined length from the linkage end 151 to the linkage end 153 at a predetermined temperature, and the linkage 150 can be formed of a material having a known coefficient of thermal expansion.

In some implementations, the linkage can include a first body portion partly extending between the first linkage end and the second linkage end, the first body portion being made of a first material and having a first predetermined length at a predetermined temperature, and a second body portion partly extending between the first body portion and one of the first linkage end or the second linkage end, the second body portion being made of a second material and having a second predetermined coefficient of thermal expansion different from the first predetermined coefficient of thermal expansion and a second predetermined length at the predetermined temperature. For example, the linkage 250 can include the first tubular body portion 252 affixed to the piston head 202 at the linkage end 251, and the second tubular body portion 254 affixed axially to each other. The first tubular body portion 252 can made of a first material having a first predetermined length and first predetermined coefficient of expansion, and the second tubular body portion 254 can be made of a second material having a second predetermined length and a second predetermined coefficient of expansion.

In some implementations, the linkage can include a first body portion affixed to the first linkage end at a first body portion end and extending to a second body portion end proximal to the second linkage end, the first body portion being made of a first material and having a first predetermined length at a predetermined temperature, a second body portion affixed to the second linkage end at a third body portion end and extending to a fourth body portion end proximal to the first linkage end, the second body portion being made of a second material and having a second predetermined length at the predetermined temperature and at least partly overlapping the first body portion by a second predetermined length at the predetermined temperature, and a third body portion extending from a fifth body portion end in contact with the second body portion end to a sixth body portion end in contact with the fourth body portion end, the third body portion being made of a third material and having a third predetermined length at the predetermined temperature and at least partly overlapping the first body portion and the second body portion by a third predetermined length at the predetermined temperature. For example, the linkage 350 includes a tubular outer linkage sleeve 352 (e.g., a first body portion) arranged concentrically about a tubular inner linkage sleeve 354 (e.g., a second body portion), and a tubular compensator sleeve 356 (e.g., a third body portion) is arranged concentrically between the tubular outer linkage sleeve 352 and the tubular inner linkage sleeve 354. One or both of the tubular outer linkage sleeve 352 and the tubular inner linkage sleeve 354 can be made of a first material having a first predetermined length and first predetermined coefficient of expansion, and the tubular compensator sleeve 356 can be made of a second material having a second predetermined length and a second predetermined coefficient of expansion.

In some implementations, the linkage can include a bias member configured to urge the fifth body portion end toward contact with the second body portion end and to urge the sixth body portion end toward contact with the fourth body portion end. For example, the example linkage 350 can include the bias member 366.

Although a few implementations have been described in detail above, other modifications are possible. For example, the techniques and structures that are described as providing axial or linear dimensional compensation for thermal effects can instead or additionally be adapted to provide lateral, radial, or any other appropriate dimensional compensation for thermal effects. In another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. An actuator comprising:
a piston configured to actuate relative to a housing, wherein the piston is configured for linear movement of a first piston end relative to the housing and the piston defines a piston cavity that is open at a second piston end opposite the first piston end;
a sensor rod configured to be actuated by the piston;
a sensor affixed to the housing and configured to detect a piston position of the piston relative to the housing based on a sensor rod position of the sensor rod relative to the sensor, wherein the sensor is affixed to the housing at a first sensor end and extends at least partly into the piston cavity through the second piston end to a second sensor end disposed within the piston cavity opposite the first sensor end and the sensor defines a sensor cavity that is open at the second sensor end; and
a linkage configured to couple the sensor rod to the piston, and to offset a change to the sensor rod position due to a temperature-induced dimensional change to at least one of the housing, piston, the sensor rod, and the sensor, wherein the linkage is affixed to the piston proximal the second piston end by a first linkage end, and extends into the piston cavity through the second piston end, between the piston and the sensor to a second linkage end proximal the first piston end; and wherein the sensor rod is affixed to the linkage at a second linkage end, and at least partly extends into the sensor cavity through the second sensor end to a second sensor rod end disposed within the sensor cavity.

2. The actuator of claim 1, wherein the linkage is configured to space the sensor rod from the piston by a predetermined, variable distance based on a coefficient of thermal expansion of the linkage.

3. The actuator of claim 1, wherein the sensor is a linear variable displacement transformer, and the sensor rod is a core rod of the sensor.

4. The actuator of claim 1, wherein at least one of the piston, the sensor rod, or the sensor has a dimension that is subject to a coefficient of thermal expansion.

5. The actuator of claim 4, wherein the sensor rod position is based on the piston position and on a temperature of one or more of the housing, the piston, the sensor rod, or the sensor.

6. The actuator of claim 1, wherein the linkage is comprised of a body having a predetermined length extending from the first linkage end to the second linkage end at a predetermined temperature, and the body is comprised of a material having a first predetermined coefficient of thermal expansion.

7. The actuator of claim 6, wherein the linkage comprises:
a first body portion partly extending between the first linkage end and the second linkage end, the first body portion comprising a first material and having a first predetermined length at a predetermined temperature and having a predetermined coefficient of thermal expansion; and
a second body portion partly extending between the first body portion and one of the first linkage end or the second linkage end, the second body portion comprising a second material and having a second predetermined coefficient of thermal expansion different from the first predetermined coefficient of thermal expansion and a second predetermined length at the predetermined temperature.

8. The actuator of claim 6, wherein the linkage comprises:
a first body portion affixed to the first linkage end at a first body portion end and extending to a second body portion end proximal to the second linkage end, the first body portion comprising a first material and having a first predetermined length at a predetermined temperature and having a first predetermined coefficient of thermal expansion;
a second body portion affixed to the second body portion end at a third body portion end and extending to a fourth body portion end proximal to the first linkage end, the second body portion comprising a second material and having a second predetermined length at the predetermined temperature and having a second predetermined coefficient of thermal expansion and at least partly overlapping the first body portion by a second predetermined length at the predetermined temperature; and
a third body portion extending from a fifth body portion end in contact with the fourth body portion end to a sixth body portion end in proximal with the second body portion end, the third body portion comprising a third material and having a third predetermined length at the predetermined temperature and having a third predetermined coefficient of thermal expansion and at least partly overlapping the first body portion and the second body portion by a third predetermined length at the predetermined temperature.

9. The actuator of claim 8, further comprising a bias member configured to urge the fifth body portion end toward contact with the second body portion end and to urge the sixth body portion end toward contact with the fourth body portion end.

10. A method of actuation comprising:
positioning a piston of an actuator at a predetermined position relative to a housing of the actuator, wherein the piston is configured for linear movement of a first piston end relative to the housing and the piston defines a piston cavity that is open at a second piston end opposite the first piston end;
positioning, by the piston, a sensor rod coupled to the piston by a linkage, at a sensor rod position relative to a sensor affixed to the housing, wherein the sensor rod position is based on the predetermined position and on a first temperature-variable dimension of one or more of the actuator, the housing, the sensor rod, and the sensor at a first temperature, wherein the sensor is affixed to the housing at a first sensor end and extends at least partly into the piston cavity through the second piston end to a second sensor end disposed within the piston cavity opposite the first sensor end, the sensor defines a sensor cavity that is open at the second sensor end, the linkage is affixed to the piston proximal the second piston end by a first linkage end, and the linkage extends into the piston cavity through the second piston end, between the piston and the sensor to a second linkage end proximal the first piston end, and the sensor rod is affixed to the linkage at a first sensor rod end, and at least partly extends into the sensor cavity through the second sensor end to a second sensor rod end disposed within the sensor cavity;
providing, by the sensor, an indication of the predetermined position based on the predetermined position at the first temperature;
modifying the first temperature-variable dimension based on a second temperature different from the first temperature;
offsetting the first temperature-variable dimension at the second temperature by a second temperature-variable dimension of the linkage at the second temperature; and
providing, by the sensor, an indication of the predetermined position based on the predetermined position and the offsetting at the second temperature.

11. The method of claim 10, wherein the linkage is configured to space the sensor rod from the piston by a predetermined, variable distance based on a coefficient of thermal expansion of the linkage.

12. The method of claim 10, wherein the sensor is a linear variable displacement transformer, and the sensor rod is a core rod of the sensor.

13. The method of claim 10, wherein at least one of the piston, the sensor rod, or the sensor has a dimension that is subject to a coefficient of thermal expansion.

14. The method of claim 13, wherein the sensor rod position is based on the predetermined position and on a temperature of one or more of the housing, piston, the sensor rod, or the sensor.

15. The method of claim 10, wherein the linkage is comprised of a body having a predetermined length extending from the first linkage end to the second linkage end at a predetermined temperature, and the body is comprised of a material having a first predetermined coefficient of thermal expansion.

16. The method of claim 15, wherein the linkage comprises:
- a first body portion partly extending between the first linkage end and the second linkage end, the first body portion comprising a first material and having a first predetermined length at a predetermined temperature; and
- a second body portion partly extending between the first body portion and one of the first linkage end or the second linkage end, the second body portion comprising a second material and having a second predetermined coefficient of thermal expansion different from the first predetermined coefficient of thermal expansion and a second predetermined length at the predetermined temperature.

17. The method of claim 15, wherein the linkage comprises:
- a first body portion affixed to the first linkage end at a first body portion end and extending to a second body portion end proximal to the second linkage end, the first body portion comprising a first material and having a first predetermined length at a predetermined temperature;
- a second body portion affixed to the second linkage end at a third body portion end and extending to a fourth body portion end proximal to the first linkage end, the second body portion comprising a second material and having a second predetermined length at the predetermined temperature and at least partly overlapping the first body portion by a second predetermined length at the predetermined temperature; and
- a third body portion extending from a fifth body portion end in contact with the second body portion end to a sixth body portion end in contact with the fourth body portion end, the third body portion comprising a third material and having a third predetermined length at the predetermined temperature and at least partly overlapping the first body portion and the second body portion by a third predetermined length at the predetermined temperature.

18. The method of claim 17, wherein the linkage further comprises a bias member configured to urge the fifth body portion end toward contact with the second body portion end and to urge the sixth body portion end toward contact with the fourth body portion end.

* * * * *